April 7, 1936.  V. G. GWATKIN  2,036,212
DEVICE FOR POSITIONING A VEHICLE IN A CONVEYANCE
Filed July 22, 1933  3 Sheets-Sheet 1
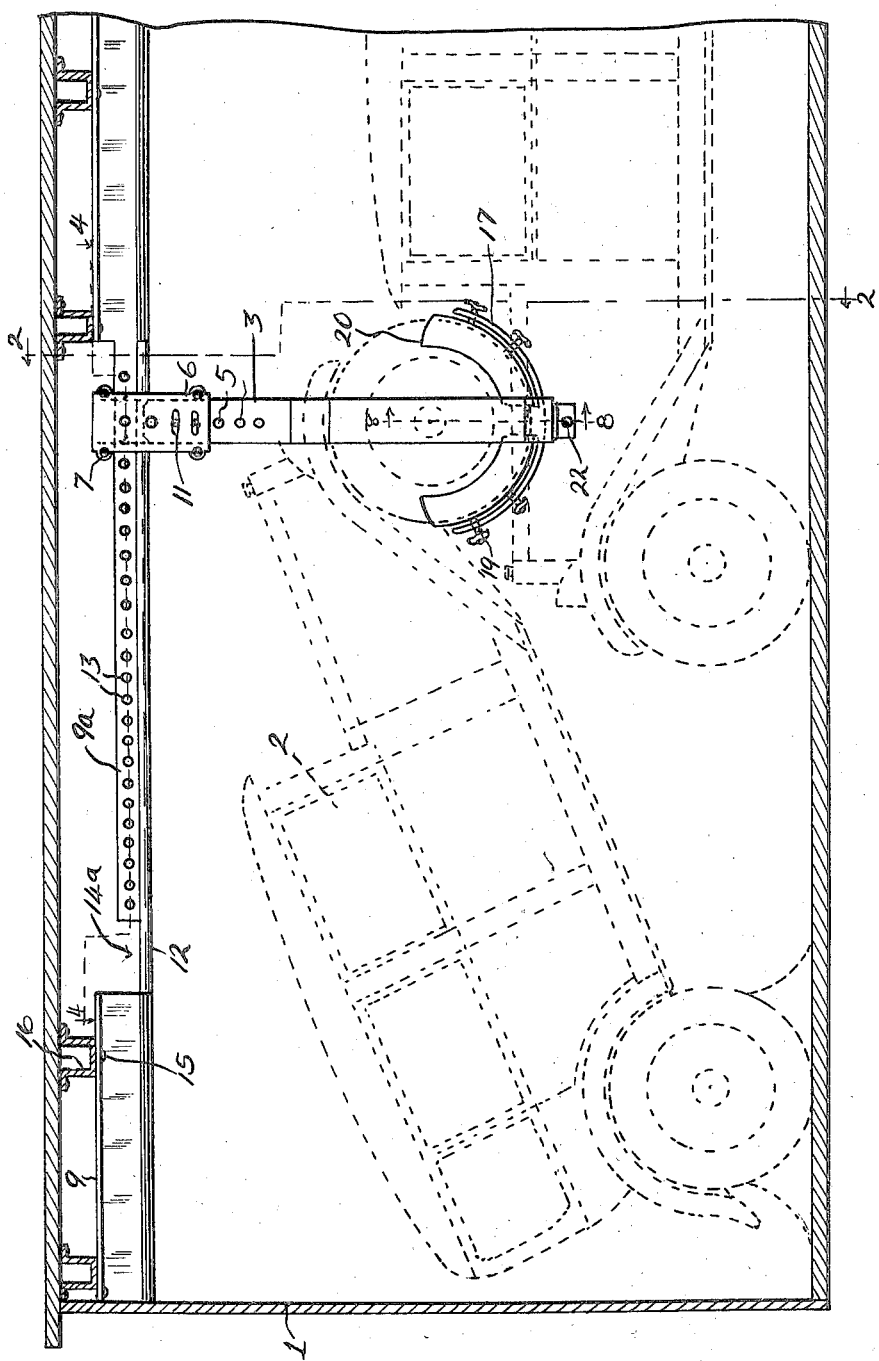
INVENTOR
Victor G. Gwatkin
BY
ATTORNEY

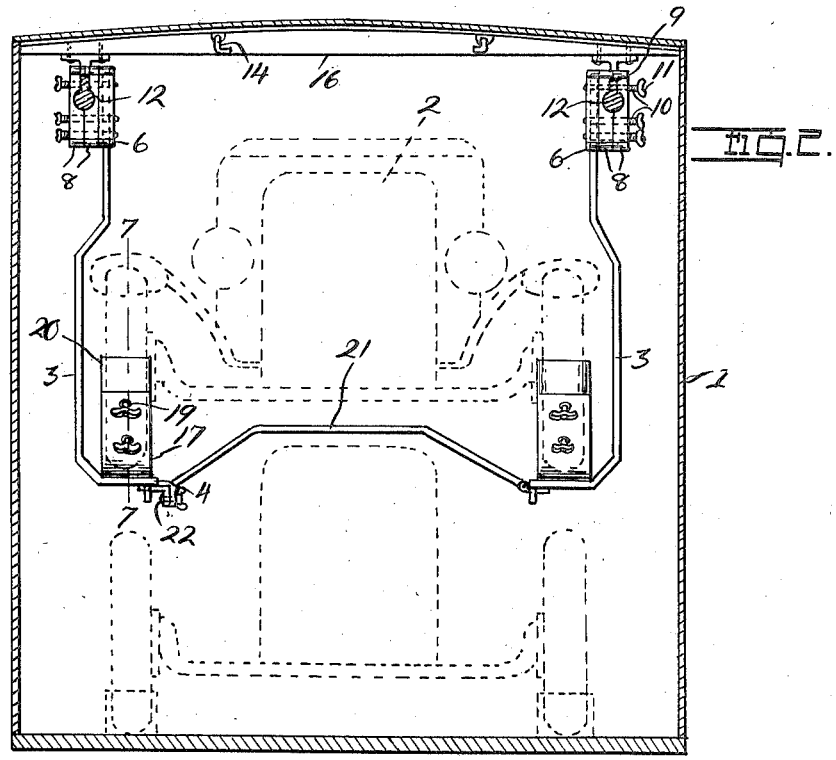

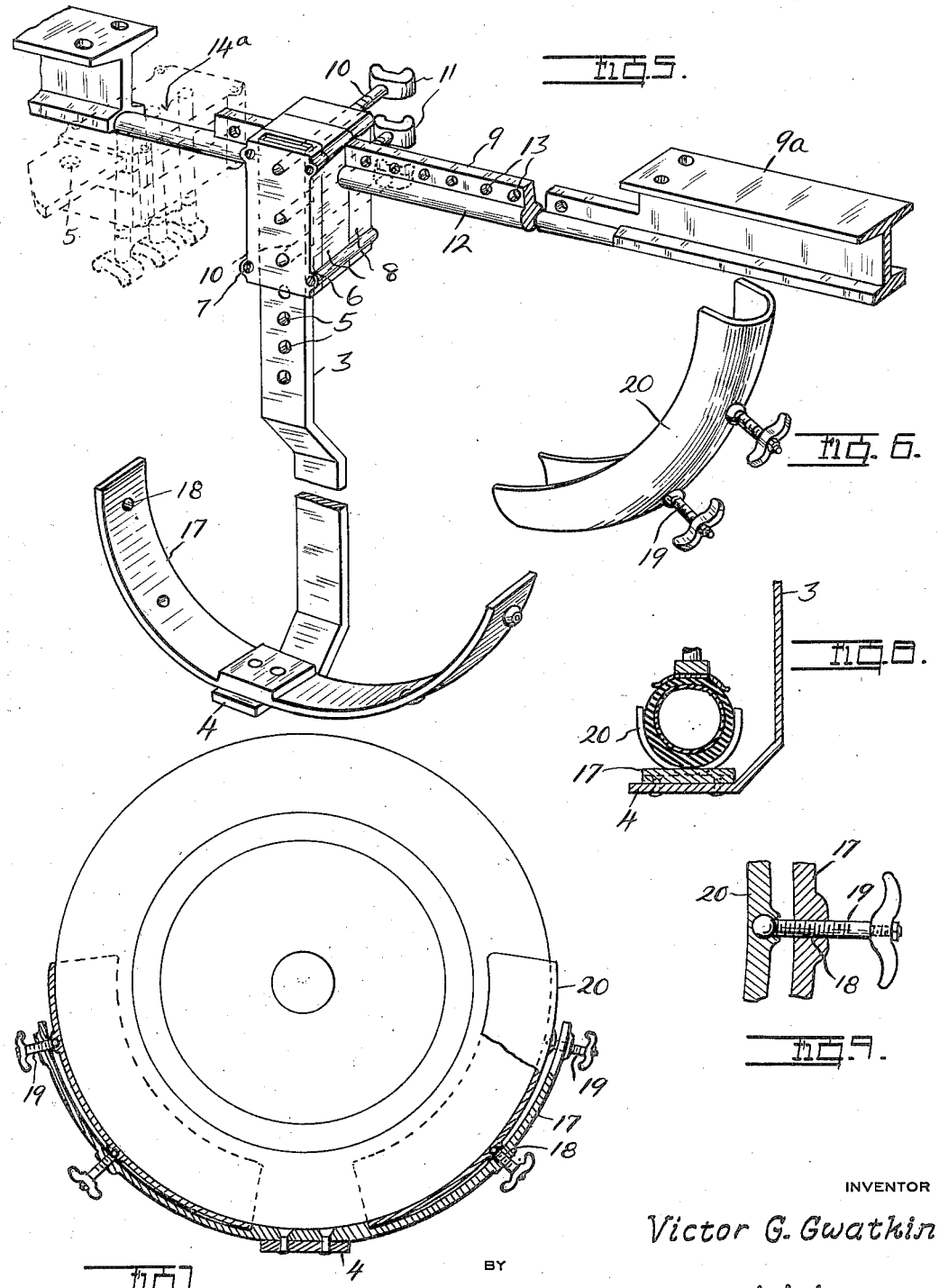

Patented Apr. 7, 1936

2,036,212

UNITED STATES PATENT OFFICE 2,036,212

DEVICE FOR POSITIONING A VEHICLE IN A CONVEYANCE

Victor G. Gwatkin, Detroit, Mich.

Application July 22, 1933, Serial No. 681,702

8 Claims. (Cl. 105—368)

This invention relates to devices for loading automobiles or other vehicles, for shipment, as in a freight car.

To accommodate a maximum number of automobiles within a freight car, or other conveyance, it is desirable to position one or more thereof on end or in an up-tilted position. Any device for so positioning an automobile must, however, permit quick loading and unloading, must accommodate itself to different makes and sizes of automobiles, must amply resist transportation shocks and vibration, and must be reasonably priced.

An object of the invention is to provide a device for holding an automobile up-tilted, which device may be quickly adjusted either vertically or longitudinally of a freight car or the like, to meet the requirements of different makes and sizes of automobiles.

Another object is to adapt such a device to be built at comparatively low cost from materials which are largely ordinary railway equipment.

Still another object is to provide a device of the described character which will obviate removal of the wheels of an automobile, and will so support said wheels as to utilize their tires to largely absorb transportation shocks and vibration.

A further object is to equip the wheel-engaging members of such a device with elements restraining the wheels from fore and aft or lateral shifting, and to adapt said elements to engage wheels of different standard sizes.

A still further object is to adapt the supporting devices, when not in use, to be swung up in close proximity to the conveyance roof, permitting full use of the conveyance for loads other than automobiles.

These and various other objects the invention attains by the construction hereinafter described and illustrated in the accompanying drawings, wherein:

Fig. 1 is a view showing, in side elevation, an automobile supported in up-tilted position by the present invention, the freight car being shown in section.

Fig. 2 is a cross sectional view of the same, taken upon the line 2—2 of Fig. 1.

Fig. 3 is a cross sectional view, showing the wheel-supporting devices swung up adjacent to the car roof, and secured in such position.

Fig. 4 is a sectional view of a hanger carrier and a slide guide for said carrier taken on the line 4—4 of Fig. 1.

Fig. 5 is a perspective view of said slide guide, carrier, and hanger, positioned for use.

Fig. 6 perspectively illustrates one of a pair of jaw members for holding a wheel on the hanger.

Fig. 7 is an elevational view of a vehicle wheel sectionally showing the jaw members and cradle, the plane of section appearing at 7—7 in Fig. 2.

Fig. 8 is a cross-sectional detail of the hanger and a wheel carried thereby, taken on the line 8—8 of Fig. 1.

Fig. 9 is a sectional detail showing one of the screws mounting a jaw member on the wheel cradle.

In these views the reference character 1 designates a freight car of the box type, and 2 an automobile loaded therein. To hold said automobile uptilted, its front wheels are engaged by a pair of hangers 3 formed of heavy bar metal, their lower ends 4 being bent toward each other to form wheel rests. The upper portion of each hanger is longitudinally formed with a row of apertures 5 and is slidably fitted in a rectangular sleeve 6. The latter is permanently secured by bolts 7 to a rectangular metallic carrier 8, adjustable longitudinally of the freight car on a slide guide 9. Preferably said carrier comprises two similar blocks, fastened together by the bolts 7 (or other suitable means), and formed at their juncture with an aperture to receive the slide guide. Said carrier and the sleeve 6 are formed with a number of vertically spaced bores individually receiving pins 10, which are engageable in selected apertures 5 to mount the hangers 3 at a desired elevation. Preferably said pins are threaded in one of the blocks 8, and terminally project beyond the latter to carry handles 11, whereby they may be readily shifted lengthwise to engage or disengage the hangers.

The slide guides are preferably formed by inverted lengths of ordinary track rail 9a, suitably fashioned. Thus each of said rails has its base and an adjacent portion of its web cut away from its mid portion, and has the head of said mid portion machined or forged to a true cylindrical form, as indicated at 12. Thus the aperture of the carrier 8 receiving said mid portion is of an inverted keyhole shape (see Fig. 2). The web of the slide guide is formed, longitudinally, with a row of apertures 13, selectively engageable by one of the pins 10 to hold the carrier and hanger variously positioned along said guide. It is preferred to cut away the web of the slide guide at one end thereof, as indicated at 14a, so that when the carrier is slid to said end, it may rock freely upon the head 12 to assume, together with its attached hanger, the raised horizontal position adjacent to the car roof, illustrated in Fig. 3. Thus when the car load is of a character other than automobiles, the wheel-supporting devices do not obstruct the load space. Preferably hooks 14 are pivoted on the car roof to terminally engage the hangers 3, when not in use, and maintain their raised positions.

The end portions of the rails 9 are riveted or bolted as indicated at 15, to the joists or ribs 16 of the roof.

Each wheel rest 4 carries an arcuate wheel cradle 17 of a radius slightly exceeding the outer radius of the maximum size of standard automobile tire. Said cradle curves similarly upward at front and rear of the wheel rest 4 and has each end portion formed with a pair of tapped openings 18, spaced circumferentially of the cradle to receive a pair of screws 19 carrying on their inner ends an arcuate jaw member 20. The members 20 serve to grip the front and back of a wheel engaging said cradle, and are of a U-shape in cross-section, so as to restrain the engaged wheel from lateral as well as forward or back motion. By relatively adjusting the paired screws which carry the jaw members the latter may be adjusted to snugly engage wheels of various diameters. The connection between said screws and jaw members are of a ball and socket nature, affording a slight angularity between said screws and members.

The lower ends of the hangers may be connected by a tie rod 21, as a further insurance against any relative lateral shifting of said ends such as could release either front wheel. As illustrated, the tie rod is hinged to one of the wheel rests, and detachably connected to the other by a pin 22.

In positioning the front wheel of a vehicle on the hangers, the latter will preferably be initially swung outwardly (or toward the freight car walls) to permit the wheels to be located between said hangers, the latter then being swung to the vertical, and the front end of the vehicle lowered to seat the wheels in the cradle 17. During such manipulation of the hangers, the carriers 8 will of course register with the openings 14a of the slide guides, so that they may rock on the members 12.

The described construction provides a relatively simple and inexpensive support for the raised wheels of an uptilted vehicle, and is readily adjustable to accommodate itself to all standard sizes and makes of automobiles.

The invention is presented as including all such modifications and changes as properly come within the scope of the following claims.

What I claim is:

1. In a device of the character described, the combination with an arcuate support for a vehicle wheel, engageable beneath said wheel, of a pair of jaw members carried by said support, one at each side of its center, and curved oppositely upwardly in proximity to the wheel tread, and means on said support for adjusting both of said jaw members relatively to conform them to wheels of different sizes.

2. In a device of the character described, the combination with a wheel cradle, of adjusting screws engaging the end portions of said cradle, and a pair of jaws mounted on said end portions by said screws and conformable by the screws to wheels of different sizes.

3. In a device of the character described, a rail comprising a base, a head, and a web integrally connecting said base and head, a portion of said base and an adjacent portion of the web being cut away, throughout a certain length of said rail and the remaining portion of the rail throughout such length forming a slide-guide, whereby said head may serve to support a member slidable on said slide-guide and such member may be restrained by the web from angular movement, said rail forming shoulders at the ends of the slide guide limiting travel of the slidable member.

4. A rail as set forth in claim 3, the web of the slide-guide being cut away for a portion of the length of the slide-guide, forming an opening with which said member is registrable to afford said member an angular travel about the head of the rail as a pivot.

5. In a device of the character described, a rail comprising a base, a head, and a web integrally connecting said base and head, the base and an adjacent portion of the web being cut away throughout a certain length of said rail, and the remaining portion of the rail throughout said length forming a slide-guide, the head of said rail being substantially cylindrical throughout the length of said slide-guide, and the web of the slide-guide being cut away to form an opening at one end of the slide-guide, whereby said head may serve to support a member slidable on said slide-guide and said web may normally restrain such member from angular movement, and said member may be registered with said opening in one limiting position of its sliding travel, and may be pivoted upon the head in such limiting position to angularly elevate said member.

6. An adjustable support comprising a rail having a substantially cylindrical portion and a web portion and having a gap in said web portion, whereby a member slidable on said rail may be supported by the cylindrical portion thereof and may be normally restrained from angular movement on said portion by the web and may be afforded such angular movement, when registered with said gap.

7. The combination with a rail and means supporting the rail substantially horizontally, of a hanger slidable on and normally depending from the rail, the rail and hanger comprising portions coacting to restrain the hanger from angular movement transverse to the rail, said portion of the rail having a gap corresponding to one position of the rail, and affording the hanger angular travel, in such position.

8. In the combination set forth by claim 7, means laterally spaced from said gap for releasably engaging the hanger and holding it in a raised position of angular travel.

VICTOR G. GWATKIN.